United States Patent Office.

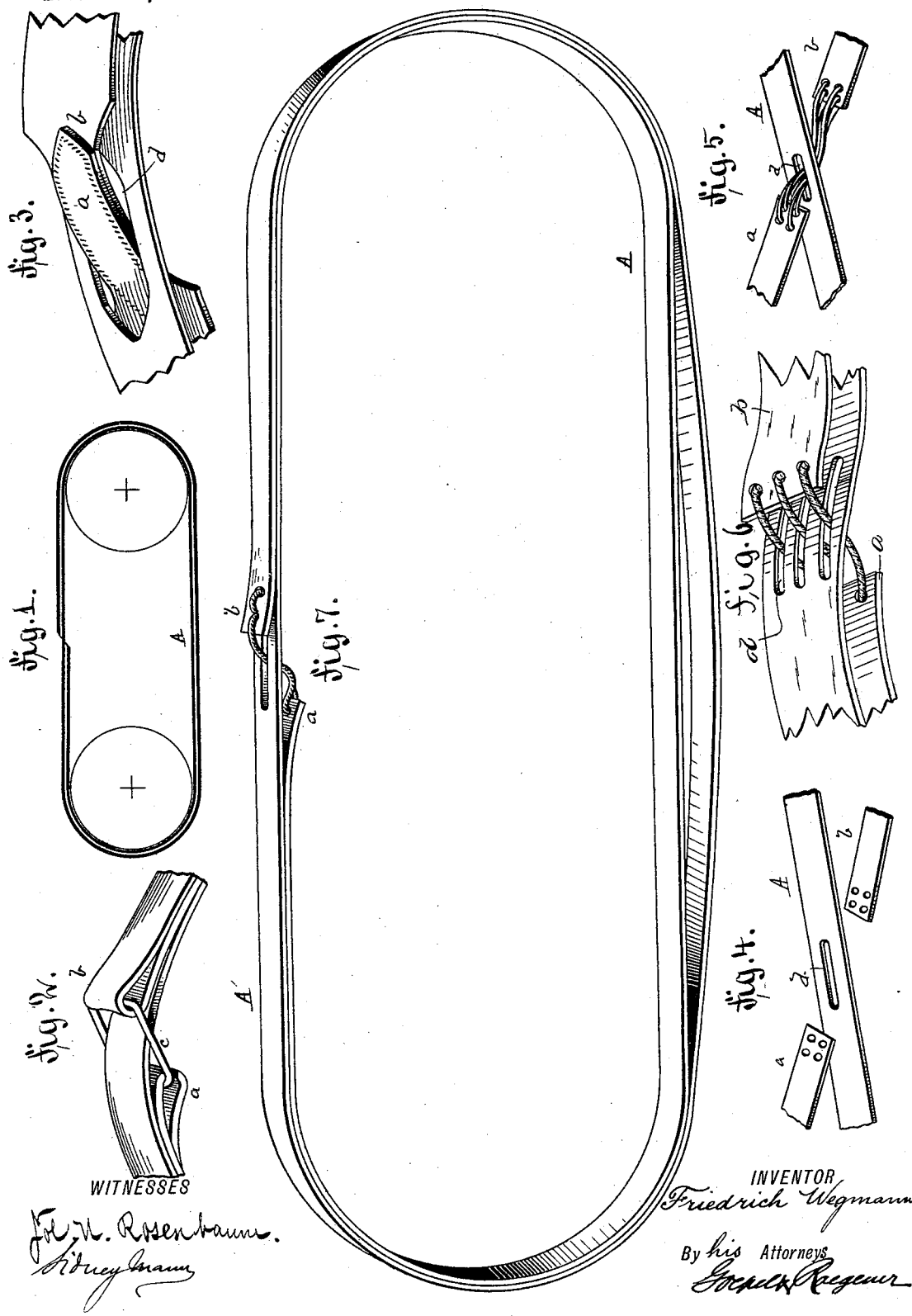

FRIEDRICH WEGMANN, OF ZURICH, SWITZERLAND.

DRIVING-BELT.

SPECIFICATION forming part of Letters Patent No. 338,896, dated March 30, 1886.

Application filed August 5, 1885. Serial No. 173,592. (No model.) Patented in Belgium July 23, 1885, No. 69,694; in England July 23, 1885, No. 8,907; in France July 23, 1885, No. 170,272; in Germany July 23, 1885, and in Austria-Hungary October 17, 1885, No. 28,908 and No. 54,498.

*To all whom it may concern:*

Be it known that I, FRIEDRICH WEGMANN, a subject of the Republic of Switzerland, residing at the city of Zurich, Switzerland, have invented certain new and useful Improvements in Transmitting-Belts, of which the following is a specification.

This invention has reference to belts and similar motion-transmitting devices, and has the object of preventing the belt from slipping from the pulleys without requiring the employment of adhesive substances.

For this purpose the invention consists of a compound belt made of leather or other suitable material, the body of which is doubled up or overlapped and connected at the ends by a link, loop, or in any other suitable manner.

In the accompanying drawings, Figure 1 represents a side elevation of my improved transmitting-belt shown as stretched on the pulleys. Figs. 2, 3, 4, 5, and 6 are perspective views showing different connection of the ends of my improved compound belt, and Fig. 7 is a perspective view of my improved transmitting-belt with loop connection of the ends, said loop being passed through a slot of the continuous layer of the belt.

Similar letters of reference indicate corresponding parts.

My improved belt is made of leather or other suitable material, and of about twice the length of a common belt of the same size, the body being doubled up or overlapped in such a manner that a double belt is obtained.

The ends *a* and *b* of the belt A are connected either by a link, *c*, as shown in Fig. 2, or by being stitched together, as shown in Fig. 3, in which case the ends are made narrower and passed through an opening, *d*, in the continuous layer of the belt, or riveting, lacing, or looping the ends together, as shown respectively in Figs. 4, 5, and 6, connection being made through a slot or slots, *d*, of the continuous layer of the belt. The belt forms thus a kind of double loop, the inner convolution of which is shortened when the outer is stretched, but in which the inner convolution cannot be elongated when the outer is shortened.

When a double or compound belt of this construction is applied to use, the contractions and elongations of the belt are caused by the fact that the outer convolution of the belt has to pass around a larger diameter, and has at the same time to pass through a longer path than the inner convolution. Consequently, the alternating pulling and shifting of the two overlapping belt-sections has the effect that the inner convolution of the belt has a constant tendency to contract, while the outer convolution, which overlaps the inner so far as the same pass around the pulleys, adheres by friction on the inner layer, and retains the same in contracted state. By this means a constant automatic tension is imparted to the belt, by which it receives the highest degree of tension, even when the belt gradually gets looser on the pulleys. The strain will always be exerted in the inner section of the belt, which begins at the point of connection at its inner end with the end of the outer section at that part of the belt located intermediately between said ends, as shown in Fig. 7. The connection of the inner and outer ends of the belt is such that the outer end can readily shift, the extra length of belt produced by the stretching of the same by use being always in the outer section, which, for that reason, sags at the lower part. The belt can thus be run for any desired length of time without requiring adjustment, as the inner belt-section will always tightly hug the pulleys.

With belts of considerable width, a number of slots are arranged in the continuous layer or portion of the belt, or the width of the belt ends may be reduced and the same passed bodily through the corresponding opening or openings of the continuous portion, and then stitched, riveted, laced, or otherwise connected. The slots or openings in the inner section of the intermediate or continuous layer of the belt have to be of sufficient length to permit the proper contraction and elongation of the same. The same principle may be applied to the cord or rope transmissions, or to belting of sheet metal or other suitable material adapted for motion-transmitting purposes.

Having thus described my invention, I claim as new and desire to secure by Letters Patent—

1. A double or compound belt of leather or other suitable material of a single length wound or doubled upon itself, as described, so as to form a free inner section and an overlapping outer section, the ends of the inner and outer sections of the belt being connected to each other by suitable means, substantially as set forth.

2. A double or compound belt made of leather or other suitable material of a single length wound or doubled upon itself, as described, so as to form a free inner section and an overlapping outer section, the inner and outer ends of said sections being connected to each other by lacings or otherwise through an opening or openings of the intermediate part of the belt, substantially as set forth.

In testimony whereof I have signed my name to this specification in the presence of two subscribing witnesses.

FRIEDRICH WEGMANN.

Witnesses:
    FRED. SCHABSLITZ,
    ROBERT STOLZ.